US006539284B2

(12) United States Patent
Nourbakhsh et al.

(10) Patent No.: US 6,539,284 B2
(45) Date of Patent: Mar. 25, 2003

(54) SOCIALLY INTERACTIVE AUTONOMOUS ROBOT

(75) Inventors: Illah Nourbakhsh, Pittsburgh, PA (US); Clay Kunz, San Francisco, CA (US); Carolyn O'Brien, Cranberry Township, PA (US); Thomas Willeke, Orinda, CA (US); Vinton Coffman, III, Moatsville, WV (US)

(73) Assignee: Axonn Robotics, LLC, Portland, OR (US)

( * ) Notice: Subject to any disclaimer, the term of this patent is extended or adjusted under 35 U.S.C. 154(b) by 0 days.

(21) Appl. No.: 09/915,161

(22) Filed: Jul. 25, 2001

(65) Prior Publication Data

US 2002/0013641 A1 Jan. 31, 2002

Related U.S. Application Data

(60) Provisional application No. 60/220,592, filed on Jul. 25, 2000.

(51) Int. Cl.$^7$ ............................................. G06F 19/00
(52) U.S. Cl. ..................... 700/245; 700/258; 701/209; 701/211; 701/214; 701/215; 701/301; 318/567; 318/568.1; 318/568.11; 318/568.12; 318/568.21
(58) Field of Search ................................. 700/245, 258, 700/104, 241; 701/45, 209, 211, 201, 214, 215, 301; 340/436, 995; 356/3.06, 631; 318/567, 568.1, 568.11, 568.12, 568.21

(56) References Cited

U.S. PATENT DOCUMENTS

| | | | | |
|---|---|---|---|---|
| 4,887,013 A | * | 12/1989 | Doth | 318/493 |
| 5,550,758 A | * | 8/1996 | Corby et al. | 198/394 |
| 5,867,804 A | * | 2/1999 | Pilley et al. | 701/120 |
| 5,950,543 A | * | 9/1999 | Oster | 104/138.1 |
| 6,216,053 B1 | * | 4/2001 | Cureton et al. | 700/104 |
| 6,320,610 B1 | * | 11/2001 | Van Sant et al. | 104/138.1 |
| 6,321,158 B1 | * | 11/2001 | DeLorme et al. | 701/201 |
| 6,370,475 B1 | * | 4/2002 | Breed et al. | 701/301 |
| 6,397,136 B1 | * | 5/2002 | Breed et al. | 701/45 |

OTHER PUBLICATIONS

Agrawal, Workspace boundaries in in–parallel manipulator systems, 1991, IEEE, pp. 1147–1152.*
Millan et al., Efficient reinforcement learning of navigation strategies in an autonomous robot, no date, Internet, pp. 15–22.*
Loffler et al., Artificial neural networks for autonomus robot control: Reflective navigation and adaptive sensor calibration, 1999, IEEE, pp. 667–672.*
Asada et al., Respresenting global world of a mobile robot with relational local maps, 1990, IEEE, pp. 1456–1461.*
U.S. patent application Ser. No. 60/220,592, Nourbakhsh, filed Jul. 25, 2000.

* cited by examiner

*Primary Examiner*—William A. Cuchlinski, Jr.
*Assistant Examiner*—McDieunel Marc
(74) *Attorney, Agent, or Firm*—James M. Singer; Pepper Hamilton LLP

(57) ABSTRACT

A robot for performing substantially autonomous movement includes a processing device, a memory, and a mobility structure controlled by the processing device. The processor directs the robot to move with any predetermined safe area having a boundary and a reference point. Optionally, the robot also exhibits features of social interactivity by accepting an input from a human, selecting dynamic content from a data base wherein the dynamic content is responsive to the input, and presenting the human with a response corresponding to the dynamic content selection.

19 Claims, 5 Drawing Sheets

SOCIALLY INTERACTIVE AUTONOMOUS ROBOT

PRIORITY

This application claims priority to the provisional U.S. patent application entitled Social Interactive Autonomous Robots, filed Jul. 25, 2000, having a Ser. No. 60/220,592.

FIELD OF THE INVENTION

The present invention relates generally to robots. More particularly, the present invention relates to a machine having substantially autonomous mobility features, and optional social interactivity features, to allow for human/machine interactions and motion within numerous areas with little or no human supervision.

BACKGROUND OF THE INVENTION

As a cultural concept, the robot has existed for many years. The real-world corollary to that cultural construct, the mobile robot, has existed for only the last few decades. As a viable technology capable of performing useful services, it has really only come into existence within the last five years.

The systems that have been deployed to date are few and limited. Mobile robots are highly complex systems built upon a technology base that is still in its infancy. The result is that prior attempts to make an autonomous mobile robot have yielded results that are highly prone to error and/or require a high degree of human supervision and support.

The few mobile robot systems that have been successfully deployed have integrated robust performance that is highly fault tolerant into the robotic system by trading off complexity and richness of performance and behavior for reliability and durability. Such systems require the use of guide paths, imprinted maps, or other devices to allow the robot only limited motion within a predetermined area. Accordingly, such prior robotic systems are not desirable because their mobility features are not easily transportable to new areas without first programming the robot or equipping the area with guide features.

In addition, the prior art attempts to deploy an autonomous mobile robot have focused on minimizing complexity of navigation methods, task performance requirements, and human/robot interactivity in order to increase the robustness and fault tolerance of the deployed system. Thus, the functionality of such robots has been limited. Human supervision and support requirements have also been high.

Accordingly, it is desirable to provide a robot that is able to navigate in an environment that is not constrained by physical barriers and/or guide paths. As well, the ability to deliver a rich and dynamic mix of informational content and/or to initiate and carry out complex human interactions is also desirable.

SUMMARY OF THE INVENTION

It is therefore a feature and advantage of the present invention to provide an improved mobile robot or other machine, preferably having social interactivity capabilities.

The above and other features and advantages are achieved through the use of a novel mobile robot as herein disclosed. In accordance with one embodiment of the present invention, an automated, mobile mechanical apparatus includes a processing device, a memory that is in communication with the processing device, a mobility structure that moves the apparatus and is controlled by the processing device, and at least one sensor for measuring an amount of movement. The memory contains computer program instructions that are capable of instructing the processor to direct the apparatus to move within a predetermined safe area having a boundary and a reference point.

Optionally and preferably, the computer program instructions are also capable of instructing the processor to, upon receipt of a command, adjust the boundary or the reference point. The computer program instructions may also be capable of instructing the processor to direct the apparatus to (i) stop or turn if the apparatus moves to a point that is substantially on the boundary, or (ii) direct the apparatus to refuse to follow a command to move to a point outside of the boundary.

The apparatus may also optionally include at least one sensor capable of detecting the presence of an object in the predetermined safe area. In this embodiment, the computer program instructions are further capable of instructing the processor to, when one of the sensors identifies an object in the predetermined safe area, direct the mobility structure to move in a direction that is toward the object. The sensor may be a sonar transceiver, a temperature-sensitive sensor, a vision sensor, an infrared sensor, or some other type of sensor.

As additional options, the apparatus may also include or use a physical guide path positioned to direct movement of the mobility structure. The apparatus may also include an input device and a database of dynamic content. When a database of dynamic content is available, the computer program instructions may be capable of instructing the processor to accept an input corresponding to a human via the input device, select a dynamic content selection from the database wherein the dynamic content is responsive to the input, present the human with a response corresponding to the dynamic content selection. The response may comprise movement, an audio response, a light display, a text message, a visual image, remote operation of an external device, or some other type of response.

Optionally, the apparatus may also include a receiver that is capable of receiving a content update. When received, the content update is stored in the database of dynamic content. Also optionally, the computer program instructions may be capable of instructing the processor to modify the database of dynamic content in response to the input. The input device may be a touch-sensitive screen, a sensor, or some other input device.

Optionally, the apparatus may also include a user recognition database, and the computer program instructions preferably are further capable of instructing the processor to accept input from a human via the input device, store data corresponding to a particular human in the user recognition database after the first time that the particular human uses the input device, and recognize the particular human during a subsequent time that the particular human uses the input device by receiving, during the subsequent time, an attribute of the particular human and comparing the attribute to information stored in the user recognition database. Preferably, the also includes a communications port, and the computer program instructions are further capable of transmitting information that is stored in the user recognition database, via the communications port through a wireless communications medium, such that the information may be received by a second apparatus.

In accordance with an alternative embodiment of the present invention, a method of enabling a mobile robot to move without the need for substantial human intervention includes the steps of: (i) defining a safe area having a boundary and a reference point, wherein the safe area is substantially free from obstacles that would restrict movement within the safe area; and (ii) directing a mobile robot having a movement means, a processor that directs the movement means, and a memory to begin movement within the safe area, wherein the memory includes computer program instructions that instruct the processor to prevent the movement means from moving the robot outside of the safe area.

In accordance with yet another embodiment of the present invention, a mobile robot includes a movement apparatus capable of moving the robot, a means for recognizing a location of the robot, a means for automatically operating the movement apparatus, and a means for determining whether an operation of the movement apparatus will result in movement of the robot outside of a predetermined boundary corresponding to a reference point, and restricting such movement outside of the predetermined boundary.

There have thus been outlined the more important features of the invention in order that the detailed description thereof that follows may be better understood, and in order that the present contribution to the art may be better appreciated. There are, of course, additional features of the invention that will be described below and which will form at least part of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting in any way.

As such, those skilled in the art will appreciate that the concept and objectives, upon which this disclosure is based, may be readily utilized as a basis for the design of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a substantially autonomous, preferably interactive, mobile device that is capable of automatic movement, such as a robot, that may be used in a variety of environments. The robot is capable of moving within a predetermined environment without human intervention. Further, the robot preferably is responsive to user inputs in order to provide for social interaction with humans.

The robot preferably consists of an apparatus or machine having a processor, a memory, and a means for moving the apparatus from one point to another. The means for moving may be any means capable of moving the apparatus, such as one or more wheels, humanoid elements such as legs and/or feet, rollers, track balls, conveyors, and/or non-contact mechanisms such as air lifts and/or exhausts that raise the apparatus from the ground surface. The apparatus may exhibit any form, such as that of a box, a kiosk, a humanoid form, a vehicular form, or any other form.

The robot is equipped with autonomous or substantially autonomous movement capabilities that are implemented in computer program instructions maintained in its memory that direct the robot to stay within a predetermined area, to avoid collisions in the area, and preferably to move toward people when detected within and/or near the area. The robot preferably makes use of an omnidirectional base, which allows the robot to move and/or spin in substantially any direction at substantially any time.

Figure 1:
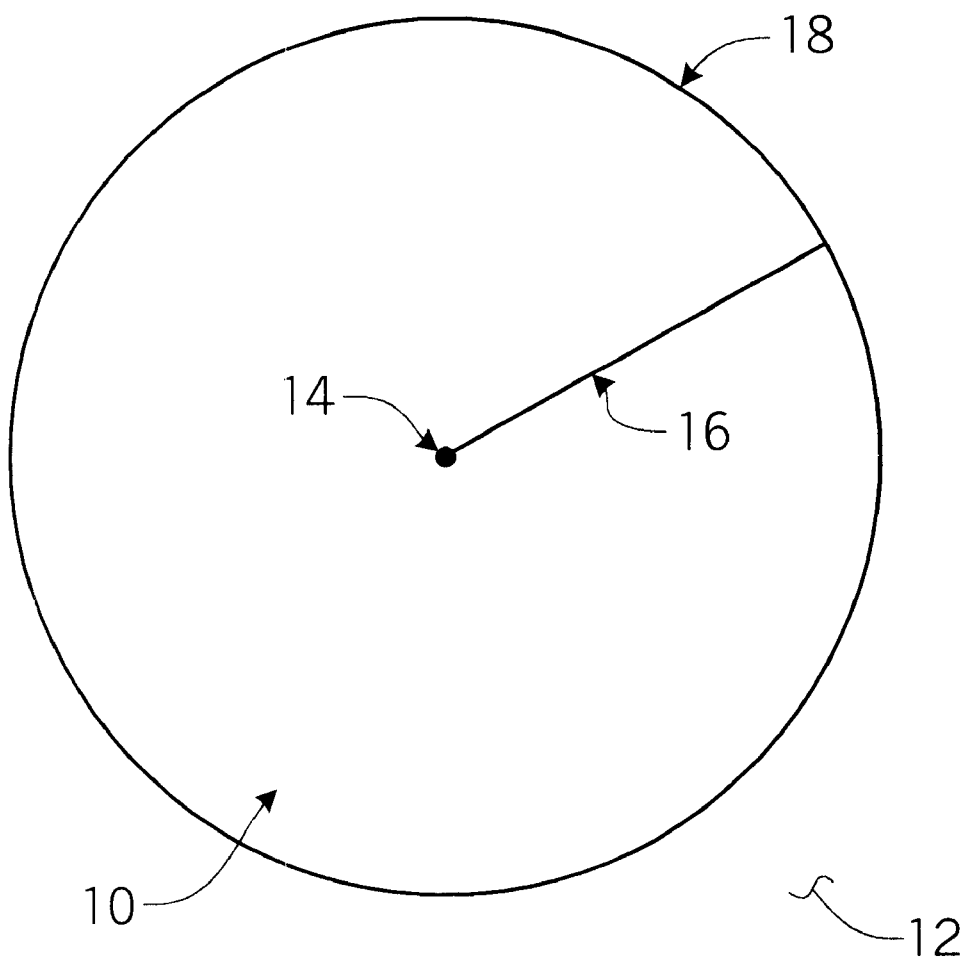
FIG. 1 illustrates an exemplary pre-determined safe area that may be used to guide the robot of the present invention.

FIG. 1 illustrates a preferred embodiment of such a predetermined area. As illustrated in FIG. 1, an exemplary safe area 10 includes a reference point 14, which is preferably the first point upon which the robot is placed or a point from which the robot identifies the safe area 10, and a radius 16 extending from the reference point 14. The reference point 14 and radius 16 define a boundary 18, in this illustration a circular boundary, within which it has been determined that the robot may move without encountering substantial obstacles and/or hazards.

The robot is capable of detecting its location with respect to the reference point 14, and determining whether a command to move the robot in any particular direction will result in movement of the robot outside of the safe area 10 and into an area other than the safe area, such as an unknown area 12. If a direction to move the robot would cause the robot to move outside of the safe area 10, a preferred embodiment is that the robot will not accept the command and thus will not move beyond the boundary 18 of the safe area 10. In the alternative, or in addition as a backup, if the robot's location detection system determines that it has moved outside of the safe area 10, the robot may be instructed to turn toward and/or return to the safe area 10. Thus, the robot is given a "virtual leash" which is tied to the reference point 14 to prevent the robot from moving outside of the safe area.

Figure 2:
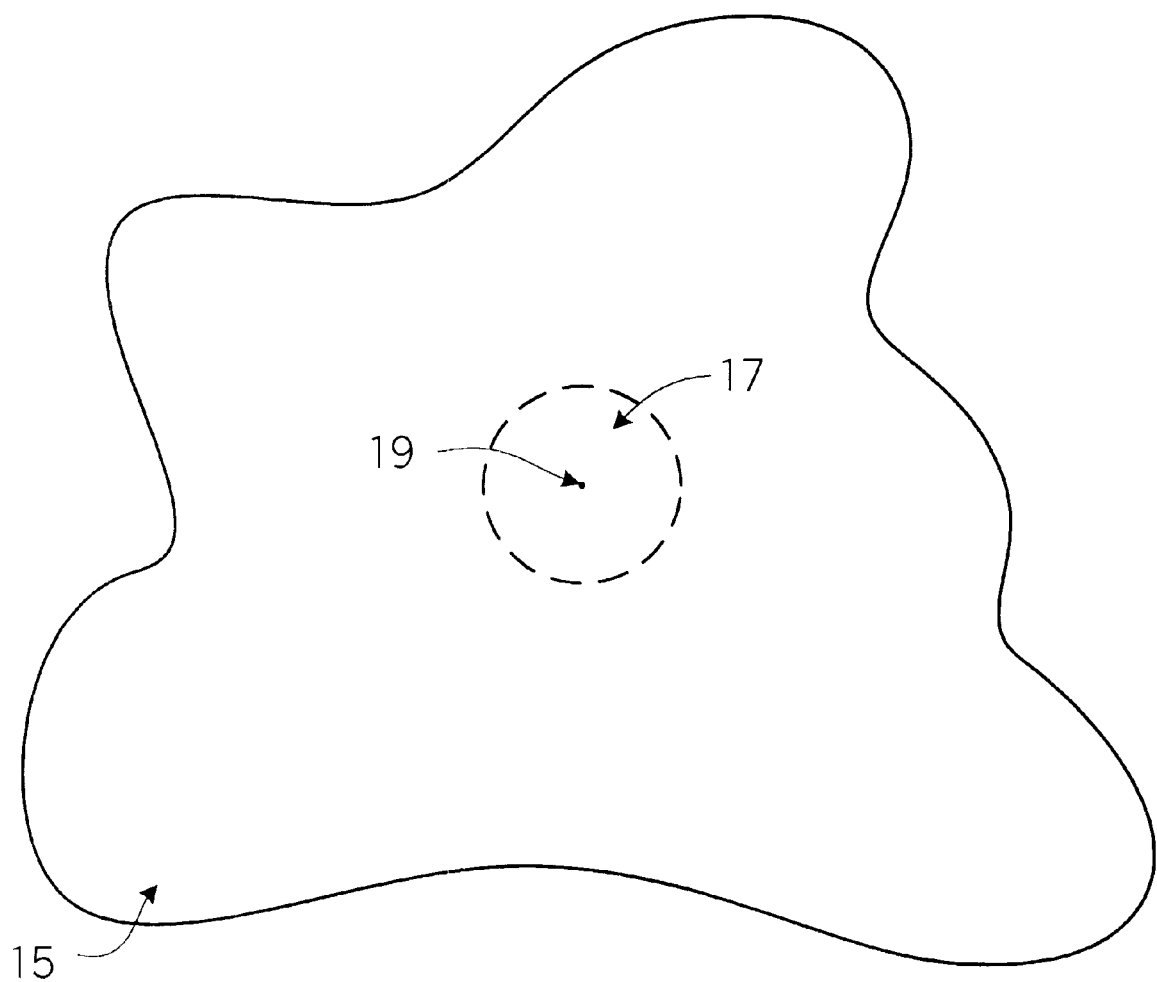
FIG. 2 illustrates an alternative exemplary pre-determined safe area that may be used to guide the robot of the present invention.

The geometric shape illustrated in FIG. 1 is only intended to be exemplary, and other shapes, such as squares, rectangles, or even undefined shapes such as that illustrated in FIG. 2 may be used, so long as a reference point and a boundary are defined. The robot identifies the reference point, illustrated in FIG. 2 as 19, and, since every shape and reference point can be described by an algorithm, defines a set of safe coordinates corresponding to the shape in accordance with the applicable algorithm. This approach extends to safe spaces of any shape. A robot can even have algorithms for many different shapes, allowing the user to change shapes (such as from circle to square to triangle, etc) and parameters for those shapes at run time.

The advantages of using this present inventive system are useful with robots having any type of navigation system, including but not limited to random wandering and pointto-point navigation systems. Navigation strategies for autonomous mobile robots generally fall into two categories: (1) random wandering and (2) point-to-point navigation, where the robot moves from location A to location B, and so on. The robots that use random navigation generally need to be in a physical setting that is constrained. In other words, every spot that the robot could possibly wander into must be a safe place for them to be. Thus, having a predetermined safe area that requires no physical guide paths or external references is especially useful. Robots that use point-to-point navigation, however, are susceptible to "drift". Since the robot believes that it is moving back and forth in the same direction, any navigational error would compound with each lap, causing drift and rotation of the robot and the route.

A preferred embodiment of the present invention follows the random navigation method. Surprisingly and advantageously, we have found that random motion helps protect a robot against drift. An additional advantage of such random motion is that it is desirable for human interactivity (as described below). As noted above, a point-to-point robot typically drifts, and drift-related errors are generally compounded with every lap. In contrast, with a randomly wandering robot this compounding of error may not occur because the robot is usually not following the same path over and over again. Instead, the robot is moving randomly and, over time, may move in most or all directions. Thus, any error that occurs during one motion will likely be canceled by error that occurs later as the robot moves in another direction. Thus, over time the error generally cancels out. Of course, in reality it may not exactly cancel out, so the center of the safe area may drift a minor amount. But this drift is created by the random amount of error which does not cancel out, and thus it will be very small. Furthermore, since the drift is, in itself, a random error, it too will likely be subject to cancellation by future drifting. In other words, as illustrated in FIG. 2, the reference point of the safe area 15 will preferably slowly wobble in an area 17 around the true (non-error) center 19. Preferably, this wobble will be subject to a bell curve probabilistic distribution, meaning that it will generally stay fairly close with decreasing likelihood of drifting further away.

As noted above, the present inventive system avoids the disadvantages of prior art mobility systems that may use physical guide paths and/or placard navigation systems. Nonetheless, the present system may be used in conjunction with such a guide path or other prior art system to enhance the reliability of such a system. Safe area navigation methodology may also be used in conjunction with placard or guide path navigation to achieve additional behaviors such as self-docking, people leading, and other behaviors in which movement of the robot to a fixed or specific location within the safe area is desired.

Figure 3:
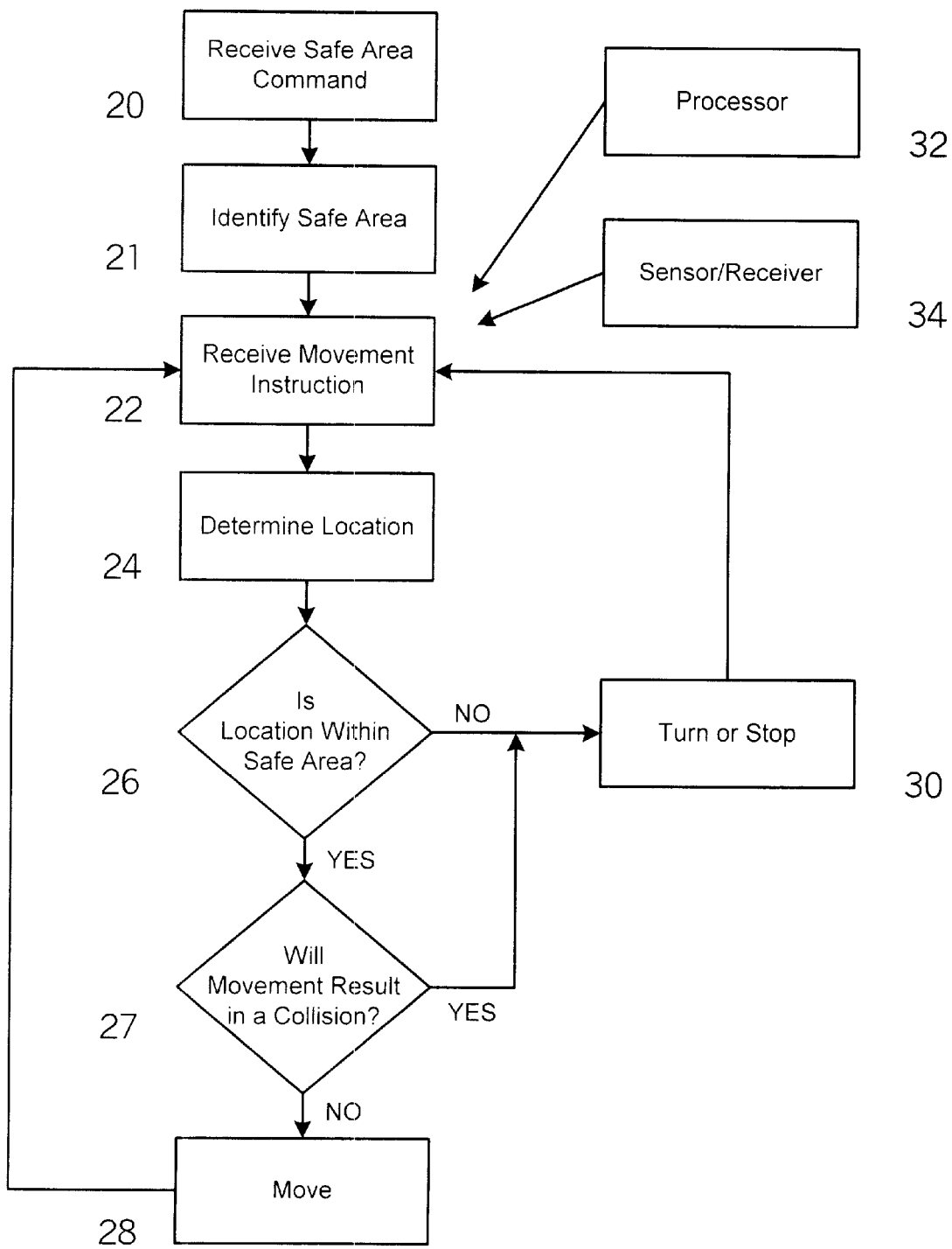
FIG. 3 is a flow chart illustrating exemplary steps that the present inventive robot may follow to move in an autonomous or substantially autonomous manner within a safe area.

FIG. 3 illustrates the steps that the computer program instructions may implement to ensure that the robot stays within the safe area. Referring to FIG. 3, a safe area is identified (step 21) as a boundary relating to a reference point.

Optionally, the boundary and/or the reference point may be redefined if a command is received to do so (step 20). As described above, the safe area can take any shape, and the safe area is defined using an algorithm corresponding to the shape and the reference point. If the robot receives a movement instruction (step 22) such as an instruction from the robot's processor 32 or from an internal sensor or from another internal or external source such as through a sensor or receiver 34, the robot will determine the location that will result from the movement instruction (step 24), determine whether the resulting location is within the predetermined safe area (step 26) and move (step 28) to that location only if the location is within the safe area. If the location is not within the safe area, the robot will turn, stop, and/or move only to the extent that the movement reaches the boundary of a safe area (step 30).

In an alternative embodiment, the movement step (step 30) may occur before one or both of the determining steps (steps 24 and 28), and thus if the robot, after moving, determines that it is outside of the safe area or at or near the border of the safe area it may stop, turn, and/or return to the safe area.

In accordance with a preferred embodiment, the step of determining a location in response to a movement instruction is accomplished through one or more sensors that detect the movement and/or position of the robot. For example, a robot having one or more wheels or trackballs may include one or more encoders or other sensors that detect and/or measure revolutions or degrees of turns. Such encoders or other sensors deliver such information to the processor, which uses the information in connection with one or more algorithms to determine the location of the device with respect to a reference point.

FIG. 3 also illustrates an exemplary embodiment of the method by which the present invention may detect objects and/or people and react through collision avoidance, human attraction, or preferably both collision avoidance and human attraction. As illustrated in FIG. 3, the robot may include a sensor 34 that detects the location of a person or object within the sensor's range. The sensor may be any type of sensor, such as a sonar sensor, temperature sensitive sensor, infrared or ultraviolet light sensor, or other sensor may detect the presence of an object or a human. When such a human or object is detected, the sensor may deliver an instruction to the processor, which receives the instruction (step 22) and reacts accordingly.

Preferably, the reaction will be such that the robot "assumes" that the object is a human, and the movement instruction therefore preferably will be to turn and face the human and/or move toward the human, or to take some other action that is directed to engaging or interacting with the human. Thus, the robot achieves person-seeking behavior. Optionally, the robot may include a camera or other appropriate visioning hardware and/or software elements to help the robot distinguish between a person and another object. As an alternative or additional option, the robot may request confirmation that a detected object is a human by providing the object/human with a prompt, such as an audio or visual prompt, to which the human must provide a response. For example, the robot may deliver an audio message requesting the object/human to press a button or touch a touch screen. If the object/human complies, then the robot will have received confirmation that the object is a human.

As the robot moves within a safe area after detecting an human or other object, a range sensor preferably determines the distance between the robot and the object so that the robot will not collide with the object. Thus, when moving, by receiving a movement instruction in response to a detected object (step 22) and determining whether the movement instruction will cause the robot to escape the safe area (step 26) or collide with an object (step 27), the preferred features of person-seeking, collision avoidance, and autonomous mobility may be achieved.

The combination of social interaction/collision avoidance and safe area lends itself well to any type of robot movement system, and it is preferably used with a robot having a random movement system so that the robot may move randomly within the safe area until it encounters a human, at which time the robot may turn and face the human and/or move toward the human. Further, upon receipt of a movement instruction (whether from a sensor or from another source), the robot preferably performs the steps of determining the location corresponding to the movement instruction (step 24) and determines whether the location is within the safe area (step 26) before moving. In the alternative, if the thing detected by the sensor 34 is something other than human, or if the robot is programmed to react in collision avoidance mode, the movement instruction may be to move away from the object or not move in a direction that would result in a collision with the object.

Preferably, the robot is capable of exhibiting both person seeking behavior and collision avoidance behavior. To do this, the robot preferably includes three different coordinate reference frames that are tracked and synchronized. The first of these is an array of range sensors mounted or included with the robot in a ring, referred to as the "sensor frame." The second is the absolute reference frame of the robot with respect to the center of the safe area (referred to as the "global frame"). The third is the robot's point of view, which depends on its orientation at any particular moment (the "local frame"). In accordance with this emboidment, when the robot is searching for people it must translate from the sensor frame of reference to the local frame of reference to determine which direction to move in. As it moves it may make the reverse translation to avoid running into obstacles. It may also translate from a local to the global reference frame to ensure that it does not move outside of its operating boundary, and it must make the reverse translation when returning to the inside of the boundary, if it ever drifts out of it. Finally, it is preferably capable of doing all of these transformations in real time at its moves, since the parameters of the transformations change as the robots position and/or orientation change.

To incorporate collision avoidance, a preferred embodiment uses range sensor data to determine whether obstacles are and modulates the robot's speed based on distances between the robot and the obstacle. This may be performed using a coordinate transform to determine which range sensors to use for obstacle detection, based on the instantaneous velocity of the motors used to activate the robot's movement system.

Figure 4:
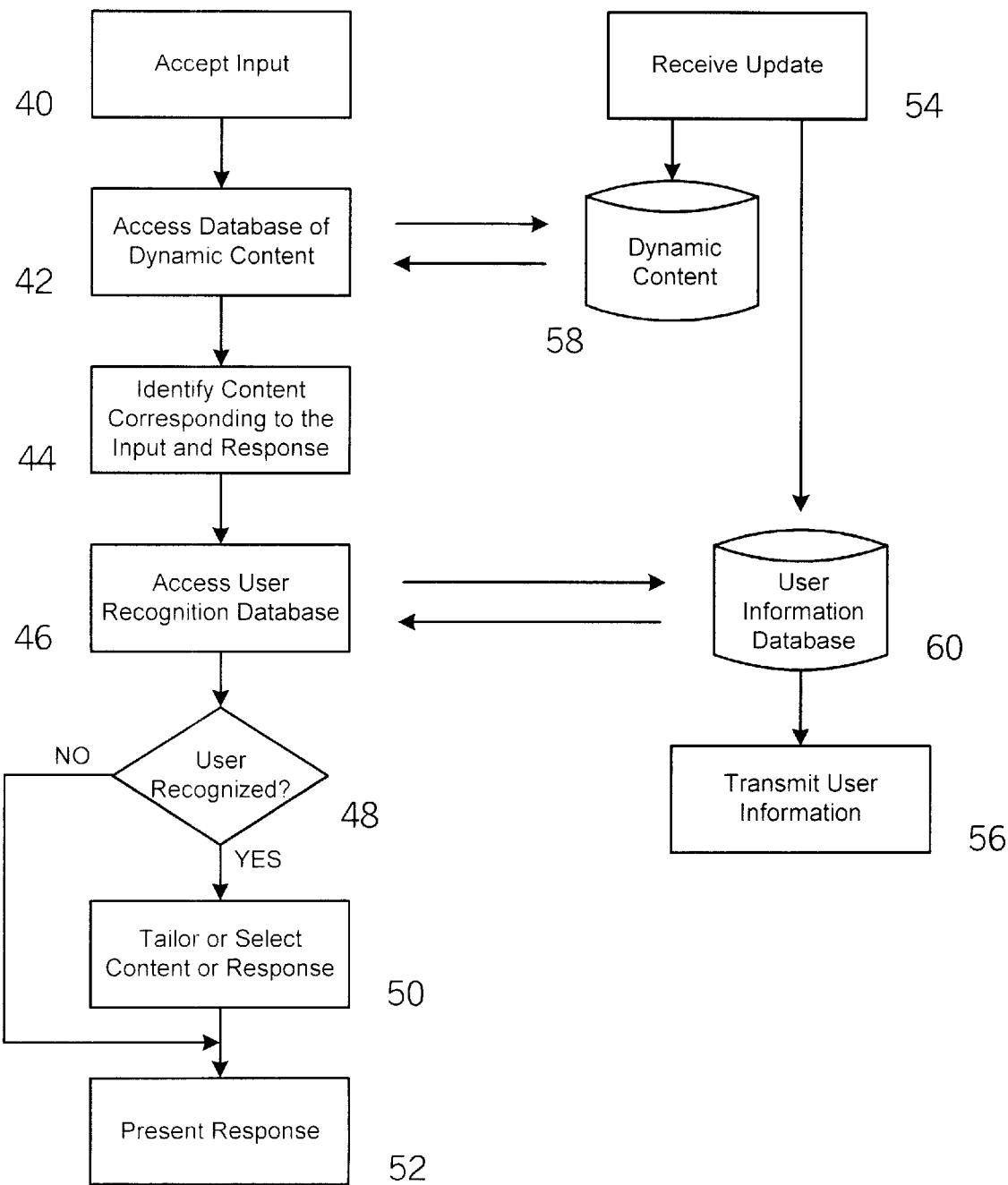
FIG. 4 is a block diagram illustrating several exemplary steps that may be taken to implement some of the optional social interactivity features of the present invention.

FIG. 4 illustrates exemplary steps that may be used to implement the social interactivity elements of a preferred embodiment of the present invention. A human may communicate with the robot, and the robot may accept such communication as input (step 40) through one of any number of types of input sources. The preferred embodiment uses a touch-sensitive screen through which a human may enter information, commands, requests, or other information. However, alternate embodiments may also or alternatively use buttons, speech recognition systems, visual recognition systems, keyboards, pointing devices such as a mouse or a light pen, a joystick or any other input device.

Upon receipt of such an input, a database of dynamic content 58 is accessed (step 42) and content corresponding to the input is identified and a corresponding response is generated (step 44). The types of dynamic content may include text, graphics, interactive scripts, internet connectivity, connectivity to transaction systems (such as hotel, airline, bus, electronic commerce, and other transaction systems), video presentations, audio presentations, or any other type of content. These forms may be used to deliver targeted advertising or promotional messages, news, weather information, answers to frequently asked questions, travel related information, reservation information, entertainment, or any other type of content. The response may be presented to the user (step 52) through a display, an audio system, a projection system, or any other type of communications medium.

Optionally, in addition to dependency on the input, the dynamic content and response selected in step 44 may also be dependent on other parameters, such as time of day, earlier input, the occurrence of specific events, or internal conditions of the robot such as battery levels, temperature, and other factors. When such parameters are used to influence the selection of dynamic content, the overall feel of the robot's response can allow the robot to exhibit broad behavioral patterns. This could be considered analogous to human moods, as a robot may respond to the same input in slightly different ways depending on such other factors. Such features allow for changing content, dynamic and new links, a high level of interactivity, unique and novel interactions, and flexibility in dealing with novel and unexpected human behavior. Further, such features facilitate production of a robot as an "off the shelf" product that is purchasable and usable by consumers untrained in robotics. The robot may also have a number of owner settable parameters, which define the overall style and feel of interacting with the robot.

As illustrated in FIG. 4, the robot may also be equipped with a transceiver and/or other input device that allows the robot to receive an update (step 54) of dynamic content and place the update in the dynamic content database. Preferably, the receipt is performed by a wireless transmission and is received automatically, without the requirement for human intervention in the receipt process.

A further level of interactivity may be provided in an optional user recognition feature. Referring to FIG. 4, when input is accepted (step 40) and preferably before presenting a final response (step 52) to a human, the system may process the input by accessing a user recognition database (step 46) and comparing the input to the information contained in the user information database to determine whether the user is recognized (step 48). If the user is recognized, the system may adjust the content and/or response or limit or obtain additional dynamic content and/or response based on the fact that the user is a recognized user (step 50).

Optionally, such information relating to individual humans may also be transmitted by the robot (step 56) to be received by other robots (step 54) as an update to either a dynamic content database and/or a user database. This allows many robots to share a growing and dynamic database of content and social history. Thus, as a human interacts with one robot in a group and then encounters another robot, the human preferably will not need to repeat certain information, and/or the second robot will recognize the human since the second robot will have the knowledge and history shared by the first robot. This also allows robot-owner inspired changes to the database to be effective for multiple robots at once, without the need to update each robot on an individual basis. With these features, robots are not required to receive and transmit all information, and the robots need not be similar clones of each other. In a preferred embodiment, each robot can also have unique private data and personalities, while sharing a certain set of data and social history with each other.

Figure 5:
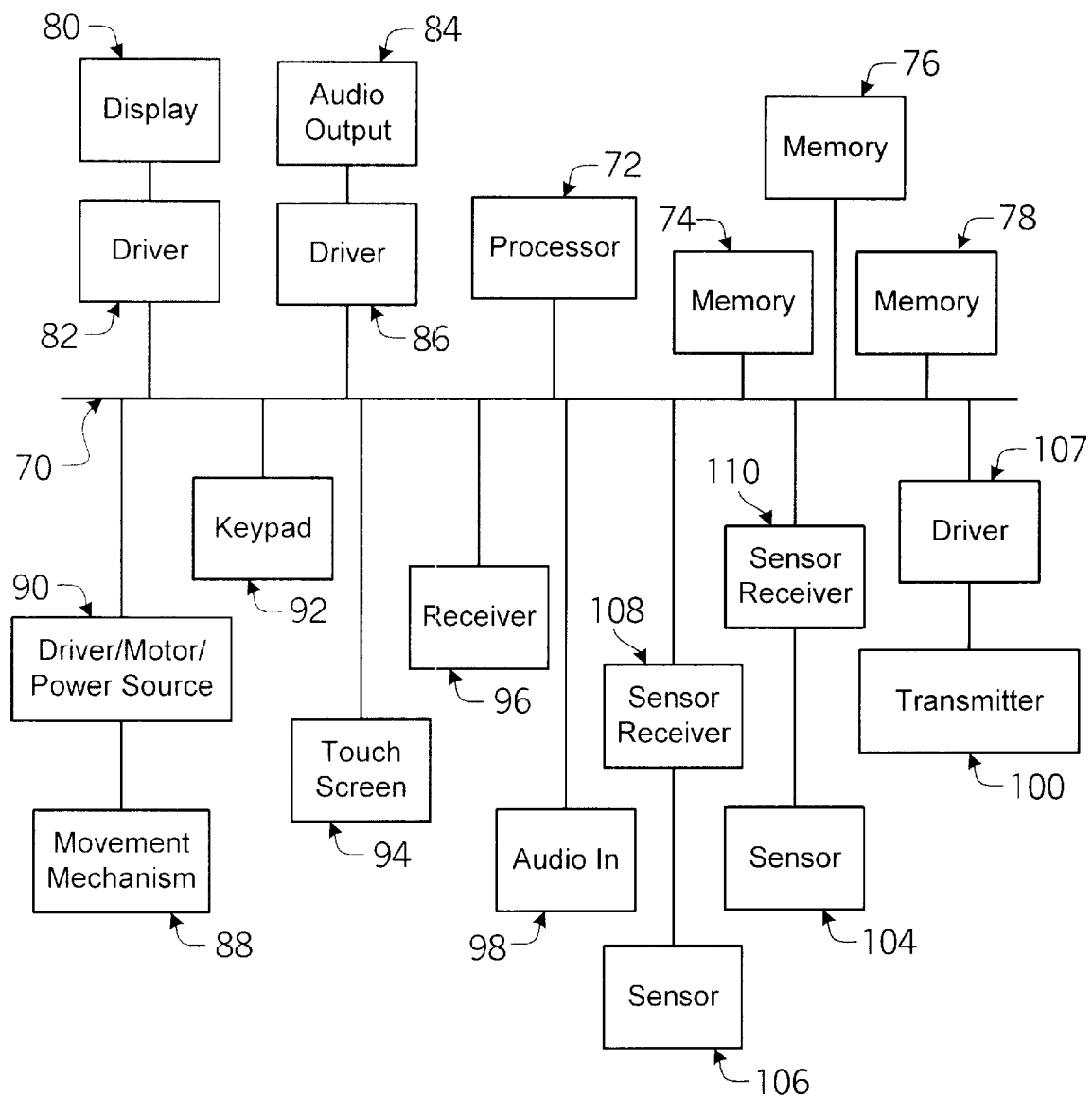
FIG. 5 is a block diagram of internal elements that may be included within the present inventive robot.

FIG. 5 illustrates exemplary hardware features that may be used to accomplish certain features of the present invention. Referring to FIG. 5, the present inventive device preferably includes a processing device 72 and a computer program memory 74 that stores computer program instructions to instruct the processor to perform certain functions. Optionally, multiple memories may be used such as 76 and 78, which may be hard drives, floppy disks, CD-ROMs, CD-Rs, DVDs, RAM, external memory devices such as ZIP drives, or other types of memory devices may be included to house additional program instructions, databases, and/or other items. A central bus 70 transfers information between the memory or memories, processor, and other elements. Such other elements may include an optional display 80 and a display driver 82, an optional audio output 84 and audio driver 86, and an optional transmitter 100 and transmitter driver 102.

The processor also controls a movement mechanism 88, such as a wheel, trackball, humanoid legs, and/or another device or devices, which are driven by a driver, motor, and/or power source 90. The movement mechanism 88 is preferably an omnidirectional mechanism that allows for movement of the robot in substantially any direction. The robot also includes one or more input devices, which may be items such as a keypad 92, touch sensitive screen 94, receiver 96, and/or audio input 98.

Preferably, the device also includes one or more sensors 104 and 106. Such sensors preferably include one or more motion detection sensors 104 that detect the movement and/or position of the robot. For example, a robot having one or more wheels or trackballs may include one or more encoders or other sensors that detect and/or measure revolutions or degrees of turns. Such encoders or other sensors deliver such information to the processor, which uses the information in connection with one or more algorithms to determine the location of the device with respect to a reference point. In addition, one or more object detection sensors 106 such as vision, infrared, and/or sonar sensors may be included to detect the existence and position of an object within the range of the sensor or sensors. Preferably, the information received by the sensors is transferred to the bus 70 via one or more sensor receivers 108 and 110 or sensor interfaces, such as a digital input/output card, analog output card, frame grabber, or other device.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, all of which may fall within the scope of the invention.

What is claimed is:

1. An automated, mobile mechanical apparatus, comprising:
   a processing device;
   a memory that is in communication with the processing device;
   a mobility structure that moves the apparatus and is controlled by the processing device; and
   at least one sensor for measuring an amount of movement;
   wherein the memory contains computer program instructions that are instructing the processor to direct the apparatus to move within a predetermined safe area having a boundary and a reference point.

2. The apparatus of claim 1 wherein the computer program instructions are further instructing the processor to, upon receipt of a command, adjust the boundary or the reference point.

3. The apparatus of claim 1, wherein the computer program instructions are further instructing the processor to direct the apparatus to stop or turn if the apparatus moves to a point that is substantially on the boundary.

4. The apparatus of claim 1, wherein the computer program instructions are further instructing the processor to direct the apparatus to refuse to follow a command to move to a point outside of the boundary.

5. The apparatus of claim 1 wherein the apparatus further comprises at least one sensor for detecting the presence of an object in the predetermined safe area, and the computer program instructions are further instructing the processor to, when one of the sensors identifies an object in the predetermined safe area, direct the mobility structure to move in a direction that is toward the object.

6. The apparatus of claim 5 wherein the at least one sensor comprises a sonar transceiver, a temperature-sensitive sensor, a vision sensor, or an infrared sensor.

7. The apparatus of claim 1 further comprising a physical guide path positioned to direct movement of the mobility structure.

8. The apparatus of claim 1 further comprising an input device and a database of dynamic content, wherein the computer program instructions are further instructing the processor to:
   accept an input corresponding to a human via the input device;
   select a dynamic content selection from the database, wherein the dynamic content selection is responsive to the input; and
   present the human with a response corresponding to the dynamic content selection.

9. The apparatus of claim 8 wherein the response comprises at least one of movement, an audio response, a light display, a text message, a visual image, and remote operation of an external device.

10. The apparatus of claim 8 further comprising a receiver, and wherein the receiver is receiving a content update and the content update, when received, is stored in the database of dynamic content.

11. The apparatus of claim 8 wherein the computer program instructions further instruct the processor to modify the database of dynamic content in response to the input.

12. The apparatus of claim 8 wherein the input device comprises at least one of a touch-sensitive screen and a sensor.

13. The apparatus of claim 8 further comprising a user recognition database, and wherein the computer program instructions are further instructing the processor to:
   accept input from humans via the input device;
   store data corresponding to a particular human in the user recognition database after the first time that the particular human uses the input device; and
   recognize the particular human during a subsequent time that the particular human uses the input device by receiving, during the subsequent time, an attribute of the particular human and comparing the attribute to information stored in the user recognition database.

14. The apparatus of claim 13 further comprising a communications port, and wherein the computer program instructions are further transmitting information that is stored in the user recognition database, via the communications port through a wireless communications medium, such that the information may be received by a second apparatus.

15. A method of enabling a mobile robot to move without a requirement for substantial human intervention, comprising:

defining a safe area having a boundary and a reference point, wherein the safe area is substantially free from obstacles that would restrict movement within the safe area; and directing a mobile robot having a movement device, a processor that directs the movement device, and a memory to begin movement within the safe area, wherein the memory includes computer program instructions that instruct the processor to prevent the movement divice from moving the robot outside of the safe area.

16. A mobile robot, comprising:

a movement apparatus for moving the robot;

a means for recognizing a location of the robot; and a means for automatically operating the movement apparatus;

a means for determining whether an operation of the movement apparatus will result in movement of the robot outside of a predetermined boundary corresponding to a reference point, and restricting such movement outside of the predetermined boundary.

17. The robot of claim 16 further comprising:

a means for maintaining stored dynamic content;

a means for accepting input from a human;

a means for selecting a dynamic content selection from the stored dynamic content, wherein the dynamic content is responsive to the input; and a means for presenting the human with a response corresponding to the dynamic content selection.

18. The robot of claim 17 further comprising a means for modifying the stored dynamic content.

19. The robot of claim 17 further comprising:

a means for identifying an object human; and a means for instructing the movement apparatus to move the robot in a direction that is toward the object.

* * * * *